April 4, 1967   R. M. PETERSON   3,312,433
MEANS FOR MOUNTING A FOOD MIXER ON A STANDARD
Filed Aug. 9, 1965   2 Sheets-Sheet 1
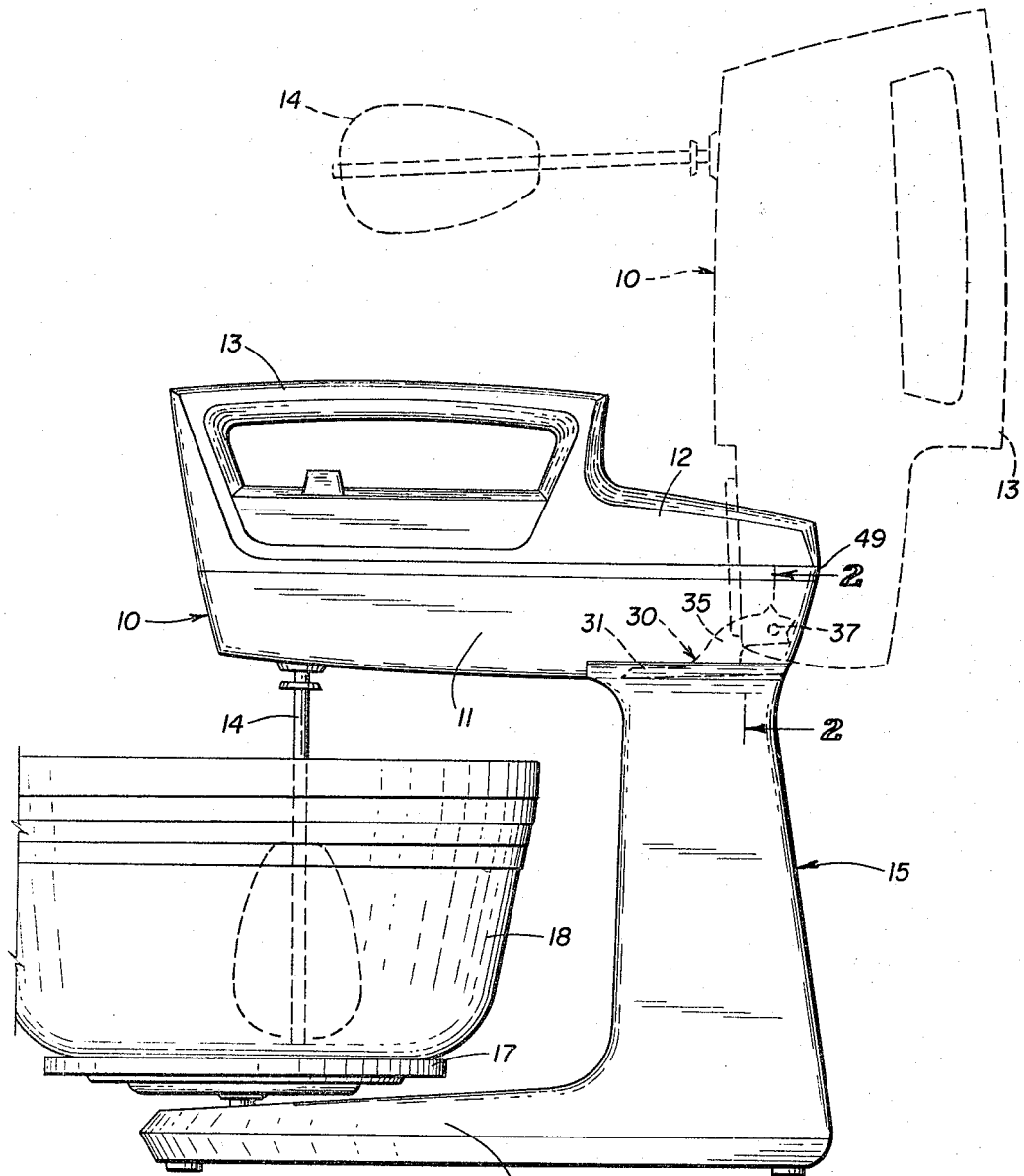
Fig_1
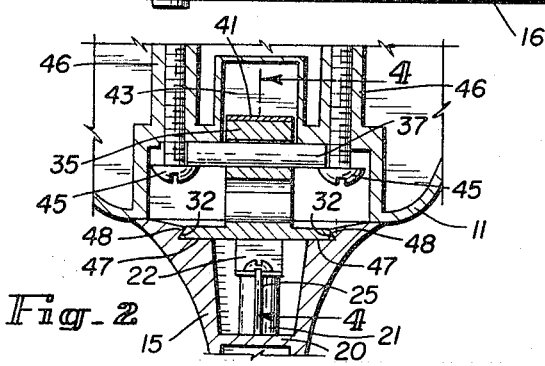
Fig_2
INVENTOR.
ROBERT M. PETERSON
BY
Bertha L. MacGregor
ATTORNEY April 4, 1967 R. M. PETERSON 3,312,433
MEANS FOR MOUNTING A FOOD MIXER ON A STANDARD
Filed Aug. 9, 1965 2 Sheets-Sheet 2
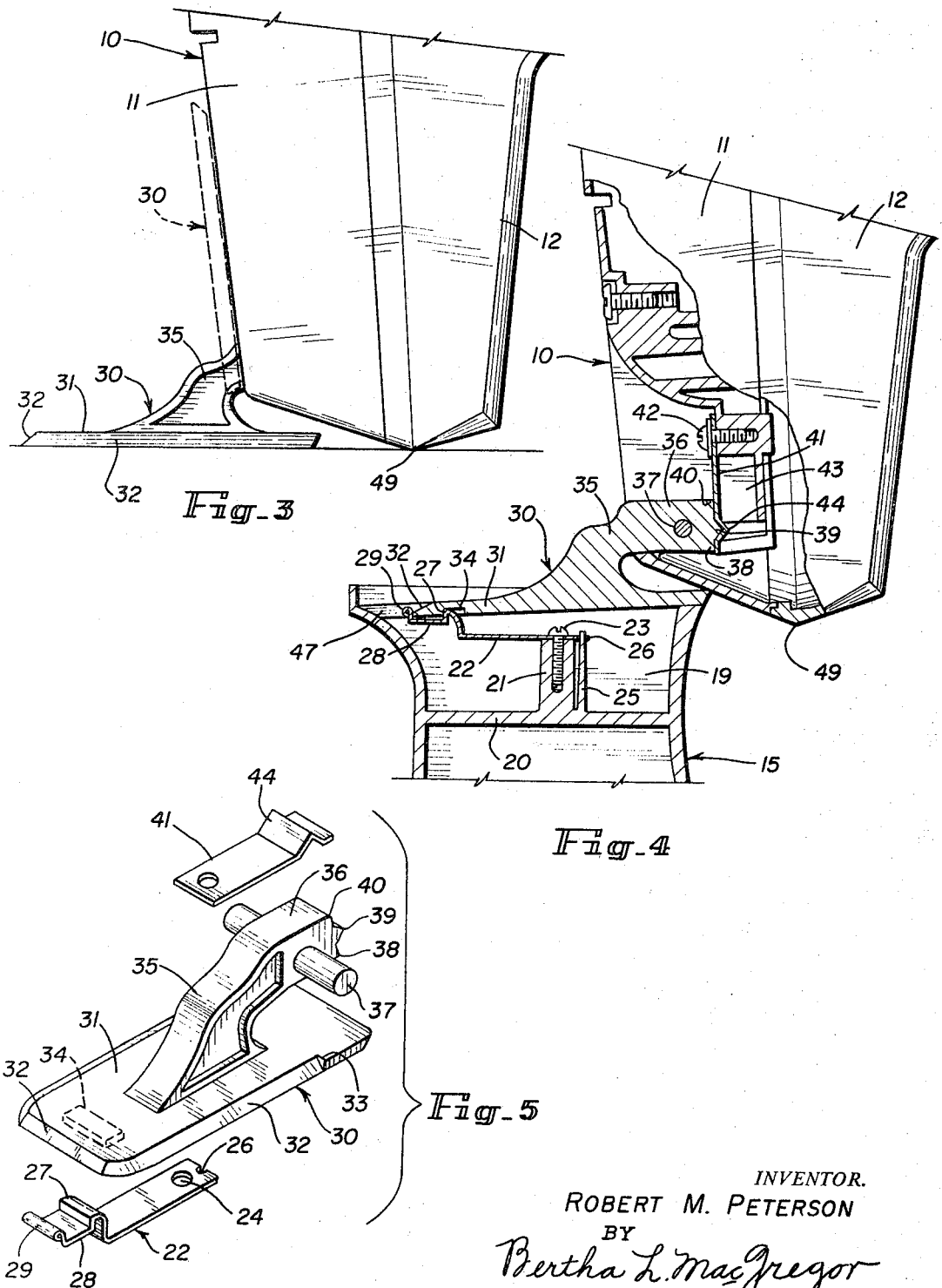
INVENTOR.
ROBERT M. PETERSON
BY
Bertha L. MacGregor
ATTORNEY

United States Patent Office 3,312,433
Patented Apr. 4, 1967

3,312,433
MEANS FOR MOUNTING A FOOD MIXER ON A STANDARD
Robert M. Peterson, Racine, Wis., assignor to Scovill Manufacturing Company, Waterbury, Conn., a corporation of Connecticut
Filed Aug. 9, 1965, Ser. No. 478,082
7 Claims. (Cl. 248—13)

This invention relates to motor driven food mixers and more particularly to means for removably mounting a food mixer on a standard.

The object of the invention is to provide a food mixer with means including a pivot bracket for removably mounting the mixer on a standard and also for supporting the mixer in longitudinally upright position when not in use. The mixer can serve to mix materials in a bowl supported on the base of the standard or as a portable mixer when removed from the standard.

When the mixer has been removed from the standard, the pivot bracket which is attached to the mixer may extend from the mixer housing at right angles thereto and support the mixer in longitudinally upright position on a table, or the bracket may be pivoted to lie adjacent the lower surface of the mixer housing when the appliance is used as a portable mixer.

In the drawings:

FIG. 1 is an elevational side view of a mixer embodying my invention supported on a standard in position to mix materials in a bowl supported on the base of the standard. The dotted lines indicate the mixer as it appears when being moved from the horizontal to the upright position on the standard.

FIG. 2 is a transverse vertical sectional view in the plane of the lines 2—2 of FIG. 1.

FIG. 3 is an elevational side view of the mixer and mounting bracket removed from the standard, the mixer being partly broken away, showing the mixer resting on its rearward end and supported by the bracket. The broken lines indicate the bracket position when the mixer is to be used as a portable mixer.

FIG. 4 is a longitudinal vertical sectional view, partly broken away, on the line 4—4 of FIG. 2.

FIG. 5 is an exploded perspective view of the parts which constitute the mounting means.

In that embodiment of the invention shown in the drawings, the mixer 10 as a whole comprises a lower housing 11, upper housing 12 with handle 13, and beaters 14. The mixer 10 is supported on the standard 15 of the base 16 on which are mounted the turntable 17 and bowl 18.

The upper end of the standard 15 is recessed at 19 and provided with a horizontal wall 20 and an internally threaded vertical boss 21, on the upper end of which a leaf spring 22 is fastened by the screw 23 which extends through the hole 24. The spring 22 is prevented from turning by engagement of the vertical pin 25 with the notch 26 in the spring 22. The free forward end of the spring 22 is upturned to form a transverse latching rib 27, then downturned to a horizontal flat portion 28 terminating in a depressible rolled edge or bead 29. The latch 27 yieldingly engages a part of the pivot bracket of the mounting means indicated as a whole at 30.

The pivot bracket 30 comprises a flat base 31 provided with an upper beveled edge 32 on its forward end and two sides terminating in a stop 33. The lower face of the base 31 is recessed as indicated at 34 for engagement by the latch 27 of the spring 22. The bracket body 35 rises from the base 31 and extends upwardly and rearwardly to form an arm 36 in which is mounted the pivot pin 37 by which the bracket 30 as a whole is pivotally attached to the mixer lower housing 11. The arm 36 is provided on its rearward face with transversely extending projections which are generally triangular in cross section. The projections 38, 39 and 40 successively engage a latching spring 41 attached to the lower housing 11 by screw 42 in a recess 43 in the housing member 11. The spring 41 is provided with a latch rib 44 shaped to engage the projection 38 and yieldingly retain the mixer in its longitudinally vertical position or to engage the projection 40 and retain the mixer in its horizontal position.

The bracket 30 as a whole is mounted in the lower housing recess 43 by the pivot pin 37 and two screws 45 which contact the ends of the pin 37 and extend into internally threaded bosses 46 in the housing 11 as shown in FIG. 2. The screws 45 also extend into the upper housing 12 and connect the two housing members together.

To mount the mixer on the standard 15, the pivot bracket 30 is placed by a sliding movement on the standard 15. This is achieved by holding the mixer in its longitudinally vertical position by the handle 13, with the base 31 of the pivot bracket 30 in a horizontal position. The base 31 contacts the surfaces 47 at opposite sides of the recess 19 of the standard 15, and is retained in the parallel grooves formed by said surfaces 47 and overhanging edges 48 which contact the beveled edges 32 of the pivot bracket base 31. The base 31 can be moved forwardly in the grooves until the stops 33 engage the rear ends of the edges 48 of the standard, and the rib 27 of the spring 22 engages the recess 34 of the bracket base as shown in FIG. 4. After the pivot bracket 30 has been inserted in the standard, the mixer as a whole can be pivotally moved into the horizontal position of FIG. 1 for mixing ingredients in bowl 18.

To remove the mixer from the standard 15, the mixer is moved to vertical position, the bead 29 of the spring 22 is depressed to release the latching rib 27, and the pivot bracket 30 is withdrawn by sliding movement rearwardly by grasping the mixer handle 13 and bodily moving the mixer and bracket to the right of FIG. 4. After removal from the standard, the mixer can be supported on a table or counter by the base 31 of the bracket 30 and by the surface 49 of the rearward end of the mixer. The engagement between the bracket projection 38 and rib 44 of the spring 41 yieldingly retains the mixer in upright position relatively to the bracket 30.

Changes may be made in details of construction and in the form and arrangement of parts without departing from the scope of the invention as defined by the appended claims.

I claim:
1. In combination with a food mixer and a standard, means for removably mounting the mixer on the standard comprising
   (a) a first latching member mounted in the upper end of the standard,
   (b) a second latching member mounted on the mixer,
   (c) a pivot bracket having a base and an arm rising from the base,
   (d) means pivotally connecting the bracket arm to the mixer,
   (e) means on the bracket base engaged by said first latching member, and
   (f) means on the bracket arm engaged by said second latching member for retaining the mixer in a selected position relatively to the standard.

2. The mounting means defined by claim 1, which includes cooperating surfaces on the standard defining a pair of spaced apart grooves for slidingly receiving the base of the pivot bracket.

3. The mounting means defined by claim 1, in which the said first latching member is a leaf spring attached to the standard, said spring having a latching rib for engaging the bracket base and a depressible free end for disengaging the latching means from the bracket base.

4. The mounting means defined by claim 1, in which the second latching member is a leaf spring attached to the mixer, the bracket arm is provided with a plurality of projections, and said spring is formed to selectively engage one of said projections for retaining the mixer in selected position relatively to the standard.

5. In combination with a food mixer and a standard, means for removably mounting the mixer on the standard comprising
   (a) a first latching member mounted in the upper end of the standard,
   (b) a second latching member mounted in a recess in the mixer,
   (c) a rigid pivot bracket having a flat base and an arm rising from the base,
   (d) means pivotally connecting the bracket arm to the mixer,
   (e) means on the standard for slidably receiving the bracket base,
   (f) means on the bracket base engaged by said first latching member, and
   (g) means on the bracket arm engaged by said second latching member for yieldingly retaining the mixer in selected position relatively to the standard.

6. The combination defined by claim 5, in which the lower surface of the bracket base is in substantially the same plane as part of the rearward end surface of the mixer when the mixer is in longitudinally upright position relatively to the standard, and said mixer and bracket are withdrawable from the standard and self-supporting on said bracket base and rearward end surface of the mixer.

7. In combination with a food mixer and a standard, means for removably mounting the mixer on the standard comprising
   (a) a horizontal wall and boss on the wall in the upper end of the standard,
   (b) a first flexible latching member attached to the boss,
   (c) a second flexible latching member mounted in a recess in the lower rearward part of the mixer,
   (d) a rigid pivot bracket having a flat base and an upwardly and rearwardly curved arm rising from the base,
   (e) means pivotally connecting the arm to the mixer in said recess,
   (f) means on the standard at opposite sides of said first latching means for slidably receiving the bracket base,
   (g) a recess in the bottom of the bracket base engaged by said first latching member, and
   (h) transversely extending projections on the bracket arm engaged by the second latching member for yieldingly retaining the mixer in selected position relatively to the standard.

References Cited by the Examiner
UNITED STATES PATENTS

| | | | |
|---|---|---|---|
| 2,326,996 | 8/1943 | Fuge | 248—13 |
| 2,438,465 | 3/1948 | Strauss et al. | 74—16 |

FOREIGN PATENTS 607,574 10/1960 Canada.

CLAUDE A. LE ROY, *Primary Examiner.*

F. DOMOTOR, *Assistant Examiner.*